US011629106B2

(12) United States Patent
Peters (10) Patent No.: US 11,629,106 B2
(45) Date of Patent: Apr. 18, 2023

(54) COATED UREA-CONTAINING FERTILIZER PARTICLES AND PROCESS FOR THE PRODUCTION THEREOF

(71) Applicant: EuroChem Agro GmbH, Mannheim (DE)

(72) Inventor: Nils Peters, Frankenthal (DE)

(73) Assignee: EUROCHEM AGRO GMBH, Mannheim (DE)

( * ) Notice: Subject to any disclaimer, the term of this patent is extended or adjusted under 35 U.S.C. 154(b) by 0 days.

(21) Appl. No.: 16/629,583

(22) PCT Filed: Jul. 13, 2018

(86) PCT No.: PCT/EP2018/069071
§ 371 (c)(1),
(2) Date: Jan. 9, 2020

(87) PCT Pub. No.: WO2019/012101
PCT Pub. Date: Jan. 17, 2019

(65) Prior Publication Data
US 2022/0112135 A1 Apr. 14, 2022

(30) Foreign Application Priority Data
Jul. 14, 2017 (DE) .......................... 102017212104.1

(51) Int. Cl.
*C05C 9/00* (2006.01)
*C05G 5/30* (2020.01)
*C05G 3/90* (2020.01)
*C09D 175/02* (2006.01)
*C09D 175/04* (2006.01)

(52) U.S. Cl.
CPC ................ *C05C 9/005* (2013.01); *C05G 3/90* (2020.02); *C05G 5/37* (2020.02); *C09D 175/02* (2013.01); *C09D 175/04* (2013.01)

(58) Field of Classification Search
None
See application file for complete search history.

(56) References Cited

U.S. PATENT DOCUMENTS 4,772,490 A * 9/1988 Kogler ................. C08G 18/542
427/221
6,001,147 A * 12/1999 Markusch ............ C09D 175/00
71/64.11
(Continued)

FOREIGN PATENT DOCUMENTS

CN 101747123 A 6/2010
EP 0 867 422 A3 10/1999
(Continued)

OTHER PUBLICATIONS

English Translation of International Preliminary Report on Patentability in International Application No. PCT/EP2018/069071, dated Jan. 16, 2020.

*Primary Examiner* — Wayne A Langel
(74) *Attorney, Agent, or Firm* — Raphael Bellum PLLC (57) ABSTRACT

A process for producing coated urea-containing fertilizer particles, comprising the following steps:
A) forming at least one polyurea layer on the uncoated urea-containing fertilizer, and then
B) forming at least one polyurethane layer on the at least one polyurea layer on the urea-containing fertilizer.

15 Claims, 1 Drawing Sheet

(56) References Cited

U.S. PATENT DOCUMENTS

| | | | | |
|---|---|---|---|---|
| 6,165,550 | A | * | 12/2000 | Markusch .......... C08G 18/7664 |
| | | | | 427/221 |
| 7,416,785 | B2 | | 8/2008 | Mente |
| 2005/0005661 | A1 | * | 1/2005 | Winter .................... C05G 5/38 |
| | | | | 71/64.02 |
| 2011/0070387 | A1 | * | 3/2011 | Schmidt ............ C08G 18/7837 |
| | | | | 428/36.9 |
| 2014/0033779 | A1 | | 2/2014 | Bertin |
| 2016/0185682 | A1 | * | 6/2016 | Katz ...................... C05C 9/005 |
| | | | | 71/27 |
| 2017/0036968 | A1 | | 2/2017 | Praw |
| 2017/0158575 | A1 | * | 6/2017 | Schneider ................ C05G 3/90 |
| 2017/0362139 | A1 | * | 12/2017 | Zhang ...................... C05G 5/30 |
| 2018/0112103 | A1 | | 4/2018 | Wallenhorst |

FOREIGN PATENT DOCUMENTS

| | | |
|---|---|---|
| EP | 0 974 569 A2 | 1/2000 |
| EP | 0 974 609 B1 | 6/2002 |
| EP | 1302 455 A1 | 4/2003 |
| WO | 98/29359 A1 | 7/1998 |
| WO | 2015/167988 A1 | 11/2015 |
| WO | 2016/166100 A1 | 10/2016 |

\* cited by examiner

COATED UREA-CONTAINING FERTILIZER PARTICLES AND PROCESS FOR THE PRODUCTION THEREOF

The invention relates to coated urea-containing fertilizer particles and to processes for production thereof.

Coated urea-containing fertilizer particles are known per se. These are typically granular, at least partly water-soluble urea-containing fertilizer particles encased by a water-insoluble but water-permeable layer. By means of the encasing, it is possible to control the dissolution rate of the fertilizer particles. In this way, it is possible to obtain long-term fertilizers having an efficacy of up to several months.

Different systems are known for the encasing of the urea-containing fertilizer particles.

Firstly, the urea-containing fertilizer, after moistening, can be reacted with an isocyanate component in order to form a polyurea layer on the fertilizer particle. WO 98/29359 describes, for example, processes for producing polyurea-encapsulated fertilizer particles. For this purpose, for example, water is applied to the fertilizer particles. Immediately thereafter, an organic aromatic diisocyanate containing isocyanate groups is applied to the water-coated fertilizer particles in order to form a polyurea layer.

US 2017/0036968 describes a process for producing encapsulated fertilizers, wherein an isocyanate component having functional isocyanate groups is likewise applied directly to the outer surface of the urea particle and then reacted with ambient humidity, forming a polyurea layer. It is also stated that a sealing layer that may comprise organic waxes, triglycerides, microcrystalline thermoplastic polymers, mineral oils, petroleum waxes or combinations thereof can be applied to the fertilizer grains thus coated. It is further stated that this sealing layer may contain different polymers in order to improve abrasion resistance and barrier properties. The nature of the polymers is otherwise undefined.

U.S. Pat. No. 7,416,785 relates to polyurethane-encapsulated fertilizer particles that are obtained by reacting an isocyanate component with a polyol derived from an initiator based on an aromatic amine on the fertilizer particles.

EP-A 0 974 609 relates to sulfur-containing isocyanate compositions that can be used for coating of fertilizer particles. The fertilizer may be a urea fertilizer. Different procedures for production of polyurethane- and/or polyurea-encapsulated fertilizer particles are described.

WO 2015/167988 relates to processes for forming encapsulated fertilizers. These involve applying an isocyanate component directly to the outer surface of the urea-containing fertilizer particle. This isocyanate component is reacted with ambient humidity in order to obtain a layer with polyurea bonds.

US 2014/0033779 relates to processes and to systems for coating of granular substrates. It is possible here to provide fertilizers with a polyurethane layer in which the polyol component is based on cardol or cardanol.

EP-A 0 867 422 relates to coated granular fertilizers and to processes for coating thereof. One coating referred to is that with a polyisocyanate and a polyol component, wherein the polyol component is a condensation product of phenol and aldehyde.

WO 2016/166100 describes coated granular materials, wherein the coating comprises a resin that comprises the reaction product of a polyol component and an isocyanate component. The resin was cured by adding a catalyst comprising an amine compound containing a hydroxyl group.

The release profile of such coated fertilizer particles is not suitable for all applications. In order to produce a long-term fertilizer, high layer thicknesses of the surface coating are often necessary.

It is an object of the present invention to provide coated urea-containing fertilizer particles that avoid the disadvantages of the known coated fertilizer particles and enable a long-term effect of the fertilizer particles with low coating thicknesses, in which the dissolution rate of the fertilizer particles in the soil is significantly lowered and hence the release of the fertilizer over a prolonged period becomes possible.

The object is achieved in accordance with the invention by coated urea-containing fertilizer particles, comprising, on the (uncoated) urea-containing fertilizer, at least one polyurea layer and further comprising, on the at least one polyurea layer, at least one polyurethane layer. There is thus no polyurethane layer beneath the (innermost) polyurea layer.

The object is additionally achieved in accordance with the invention by a process for producing coated urea-containing fertilizer particles, comprising the following steps:

A) forming at least one polyurea layer on the uncoated urea-containing fertilizer, and then B) forming at least one polyurethane layer on the at least one polyurea layer on the urea-containing fertilizer.

What is meant here by the term "urea-containing fertilizer" is "urea-containing fertilizer particle". Accordingly, the at least one polyurea layer is formed on the (uncoated) urea-containing fertilizer particles and the at least one polyurethane layer on the at least one polyurea layer on the urea-containing fertilizer particles.

It has been found in accordance with the invention that a multilayer coating, with formation firstly of a polyurea layer and subsequently of a polyurethane layer above it, leads to coated urea-containing fertilizer particles that permit slow release of the urea-containing fertilizer. Thus, controlled release over a prolonged period is possible. It is already possible here with low layer thicknesses and correspondingly lower costs to achieve a long-term effect of the urea-containing fertilizer. There is accordingly preferably (exactly) one polyurea layer and (exactly) one polyurethane layer.

According to the invention, the polyurea layer is on the inside on the (uncoated) urea-containing fertilizer particles, also because it has better adhesion to urea than a polyurethane. Therefore, the polyurethane layer is applied to the outside of the polyurea layer. The polyurea layer can thus also act as adhesion promoter for the polyurethane layer on the urea of the urea-containing fertilizer particle.

The urea-containing fertilizer particles used in accordance with the invention for coating are known per se.

The fertilizer particles may be in any desired outer form and any grain size. The fertilizer particles are typically in the form of granules or pellets. Pellets here may take the form, for example, of a rod, cylinder, sphere or ellipsoid. Granule grains are typically asymmetric aggregates of powder particles.

The grain size of the fertilizer particles is typically in the range from 0.2 to 15 mm, more preferably in the range from 1 to 5 mm. The grain size quoted here is the average longest diameter of the particles. The grain size can be determined optically, for example, with the aid of a Camsizer.

The fertilizer particles contain urea. The urea content in the urea-containing fertilizer is preferably at least 30% by weight, more preferably at least 50% by weight, especially at least 85% by weight, based on the uncoated urea-containing fertilizer. Particular preference is given to using urea as the urea-containing fertilizer.

In addition to urea, the urea-containing fertilizer particles may comprise further customary fertilizer components. Useful examples here include individual or multiple nutrients comprising nutrients such as nitrogen, potassium, phosphorus, sulfur, in any combination, typically in the form of their salts or oxides. One example is a sulfur-containing urea having a sulfur content of 3% to 15% by weight, preferably 5% to 10% by weight, based on the sulfur-containing urea, e.g. YaraVera UREAS. Examples of fertilizers that may be present alongside urea in the fertilizer particles of the invention are N, NP, NK, PK or NPK fertilizers. Examples include ammonium sulfate, ammonium sulfate nitrate, calcium ammonium nitrate, ammonium nitrate or calcium cyanamide. As well as the main constituents mentioned, it is also possible for further salts or trace elements to be present in the fertilizer particles, for example of magnesium, iron, manganese, copper, molybdenum and/or boron.

Such additives or trace elements are typically present in amounts of 0.1% to 5% by weight, more preferably of 0.25% to 3% by weight, based on the urea-containing fertilizer.

More preferably in accordance with the invention, urea is used as the sole fertilizer.

The fertilizer may additionally comprise a further active ingredient, such as plant protection agents, pesticides, growth regulators, trace elements, soil improvers, nitrification inhibitors, urease inhibitors, pheromones, repellents or mixtures thereof. Preference is given at least to the additional use of at least one urease inhibitor. The amount of the urease inhibitor used additionally is preferably 0.02% to 0.2% by weight, more preferably 0.03% to 0.1% by weight, based on the urea in the urea-containing fertilizer. Suitable urease inhibitors are known to those skilled in the art. Suitable urease inhibitors are, for example, phenyl phosphorodiamidate (PPD), N-butylthiophosphoramide (NBTPT or NBPT), monophenoxyphosphazene, β-mercaptoethanol, acetohydroxamic acid (AHA), thiourea or hydroxyurea. Suitable urease inhibitors are mentioned, for example, in DE 10 2007 062 614. Suitable (thio)phosphoric acid triamides and (thio)phosphoric acid diamides are described therein and summarized in the general formulae (I) and (II) specified. These urease inhibitors may also be used together with an amine having a boiling point of more than 100° C. in order to reduce the volatility of the urease inhibitor.

Preference is given in accordance with the invention to the use of at least one (thio)phosphoric acid diamide or (thio)phosphoric acid triamide of the general formulae (I) and (II), as described in DE 10 2007 062 614. Particular preference is given to using NBPT or NBTPT.

Customary nitrification inhibitors may be used, such as dicyandiamide (DCD) or pyrazole compounds, such as 3,4-dimethylpyrazole, 3,4-dimethylpyrazole phosphate, and the reaction products thereof with maleic anhydride, 2-(N-3,4-dimethylpyrazole)succinic acid, which is an isomer mixture of 2-(3,4-dimethyl-1H-pyrazol-1-yl)succinic acid and 2-(2,3-dimethyl-1H-pyrazol-1-yl)succinic acid. For a description of this nitrification inhibitor, reference may be made, for example, to WO 2015/086823. Suitable amounts are 0.1% to 1.0% by weight, preferably 0.13% to 0.6% by weight, based on the urea in the urea-containing fertilizer.

Typically, owing to the coating of the urea-containing fertilizer, it is possible to dispense with the additional use of a nitrification inhibitor.

For production of the urea-containing fertilizer particles coated in accordance with the invention, at least one polyurea layer is first formed on the uncoated urea-containing fertilizer particles and then subsequently at least one polyurethane layer is formed on the at least one polyurea layer. This means that the polyurea layer is in direct contact with the urea of the urea-containing fertilizer particle.

It is preferably possible here to form exactly one polyurea layer A) and one polyurethane layer B). However, it is also possible to form multiple polyurea layers A) and multiple polyurethane layers B). It is possible here to divide the desired total layer thickness between the individual layers. There are preferably no other additional layers apart from an anticaking layer optionally present on the polyurethane layer B).

The term "uncoated urea-containing fertilizer particle" relates to urea-containing fertilizer particles to which no polyurea layer and no polyurethane layer has been applied yet. Thus, the term "uncoated" means "not having a polyurea layer or polyurethane layer". It may be the case that other coatings are already present, for example coatings with trace elements or other auxiliaries (such as anticaking agents) or adhesion promoters. More preferably, in step A), the at least one polyurea layer is applied to an entirely uncoated urea-containing fertilizer, meaning that the solid urea-containing fertilizer does not have any surface coating prior to the forming of the polyurea layer.

Step A—Forming of the Polyurea Layer

In a first step, the polyurea layer is formed preferably by reacting an organic isocyanate component containing more than one isocyanate group with water on the surface of the urea-containing fertilizer particles. The isocyanate component may be reacted here with liquid water or steam on the surface of the urea-containing fertilizer particles. The environment of the fertilizer particles may have been moistened here, for example by using moist air, or the moisture may be applied to the urea-containing fertilizer particles in the form of vapor or liquid.

Frequently, the mere presence of air humidity originating from the environment, for example, is insufficient to form the polyurea layer. It is therefore advantageous for formation of a stable polyurea layer with good adhesion to apply water or steam to the (uncoated) urea-containing fertilizer particles in a first step, in order to obtain fertilizer particles coated on the surface with water.

Preferably, step A) comprises the following steps:

A1) applying water or steam to urea-containing fertilizer particles in order to obtain water-coated fertilizer particles, A2) applying an organic isocyanate component containing at least two isocyanate groups to the water-coated fertilizer particles and reacting it therewith to form a polyurea layer on the urea-containing fertilizer particle.

In this first step A), no polyol is applied to the urea-containing fertilizer particles.

The polyurea layer therefore preferably does not contain any polyurethanes. Small added amounts of a polyurethane are uncritical here. The polyurethane content in the polyurea layer based on the polyurea layer, however, should preferably be not more than 15% by weight, more preferably not more than 10% by weight, especially not more than 5% by weight. There are preferably no polyurethanes in the polyurea layer.

According to the invention, no polyol is used additionally in the reaction of the isocyanate component with water to form a polyurea layer. The additional use of small amounts of polyol is uncritical but not preferred. The amount of polyol in step A) is preferably not more than 5% by weight, more preferably not more than 2% by weight, especially not more than 0.5% by weight, based on the amount of the isocyanate component used.

Preferably, water is applied to the dry urea-containing fertilizer particle in an amount of 0.25% to 5% by weight, more preferably 0.5% to 2% by weight, especially 0.3% to 1.5% by weight, based on the urea content in the dry urea-containing fertilizer particle.

The isocyanate component is applied before, with or after the water. This is an organic compound containing an average of more than one isocyanate group or a mixture of such compounds. Preference is given to isocyanate components containing at least two isocyanate groups. The isocyanate component typically comprises a polyisocyanate having two or more functional isocyanate groups. Suitable polyisocyanates are, for example, aliphatic, cycloaliphatic, araliphatic and aromatic isocyanates. For example, the isocyanate component may be selected from diphenylmethane diisocyanates (MDI), oligomeric or polymeric diphenylmethane diisocyanates (PMDI) and combinations thereof. Polymeric diphenylmethane diisocyanates may also be referred to as polymethylene polyphenylene polyisocyanates. As well as MDI as the preferred isocyanate, it is also possible to use toluene diisocyanates (TDI), hexamethylene diisocyanates (HDI), isophorone diisocyanates (IPDI), naphthalene diisocyanates (NDI) and combinations of these, and also the isocyanate components described for step B).

The isocyanate component may also be an isocyanate-terminated prepolymer. The isocyanate-terminated prepolymer is typically the reaction product of an isocyanate and a polyol and/or a polyamine. It is possible here, as well as the aforementioned isocyanates, to use different polyols and polyamines. Suitable prepolymers may thus have polyurethane bonds. The outcome is that polyurethane polyureas are then formed as the polyurea layer.

If, for example, an isocyanate-terminated prepolymer of MDI and a polyol having at least two hydroxyl groups is used, this prepolymer contains polyurethane bonds.

In this prepolymer, the polyol may preferably be selected from ethylene glycol, diethylene glycol, propylene glycol, dipropylene glycol, butanediol, glycerol, trimethylolpropane, triethanolamine, pentaerythritol, sorbitol and combinations thereof. Polyols may also be graft polyols or polymer polyols. Polyamines may include, for example, ethylenediamine, toluenediamine, diaminodiphenylmethane and polymethylene polyphenylene polyamines, and also amino alcohols and mixtures thereof. Examples of suitable amino alcohols are ethanolamine, diethanolamine, triethanolamine and combinations thereof.

It is also possible to use (modified) isocyanates, as described in paragraphs [0031] to [0041] of US 2017/0036968. Further possible isocyanate components are mentioned in WO 2016/166100 at page 10 line 15 to page 11 line 2. Isocyanate components suitable for step A) are additionally described in WO 98/29359, page 6 line 26 to page 11 line 25. Cardanol and cardol and the preparation thereof are also described in DE-A-101 58 693.

The isocyanate component is preferably not a prepolymer.

The isocyanate functionality of the isocyanate component is preferably in the range from 1.5 to 4, more preferably 2 to 3.

As well as the isocyanate component, it is also possible to additionally use further customary additives, such as catalysts, fillers, plasticizers, stabilizers, crosslinkers, chain extenders, etc.

For additives of this kind, reference may be made to paragraph [0041] of US 2017/0036968.

The isocyanate component is preferably used in an amount of 0.25% to 5% by weight, more preferably 0.5% to 3% by weight, especially 0.75% to 1.5% by weight, based on the uncoated dry urea-containing fertilizer particle. Particular preference is given to using isocyanate component and water in a weight ratio of 0.5 to 2:1, more preferably 0.75 to 1.5:1, especially about 1:1.

The weight of the polyurea layer, based on the uncoated dry urea-containing fertilizer particle, is preferably 0.5% to 5% by weight, more preferably 0.6% to 2.5% by weight, especially 0.75% to 2.0% by weight.

The reaction of the isocyanate component with water on the urea-containing fertilizer is preferably effected in the presence of a catalyst. This may be a liquid or gaseous catalyst. Suitable catalysts are mentioned, for example, in US 2017/0036968 in paragraphs [0042] to [0047]. In addition, reference may be made to the catalysts described in WO 2016/166100.

The polyurea layer and/or the polyurethane layer may thus be formed in the presence of a preferably basic catalyst. The catalyst used here is preferably at least one amine compound which is more preferably reactive with isocyanates.

The amine compound may be used here in a gas curing or liquid curing operation, i.e. may be in gaseous form or liquid form in the formation of the polyurea layer and/or the formation of the polyurethane layer.

In the case of gas curing, preference is given to using low-boiling amines that preferably have a boiling point of less than 100° C., more preferably a boiling point of less than 90° C. Examples of suitable low-boiling amines are tertiary amines, especially tertiary alkylamines. Examples of suitable tertiary alkylamines are those that have $C_{1-4}$-alkyl radicals, more preferably $C_{1-3}$-alkyl radicals, especially methyl or ethyl radicals. For example, it is possible to use triethylamine or dimethylethylamine. Further suitable low-boiling tertiary alkylamines are known to those skilled in the art.

These tertiary amines are typically not incorporated by reaction in the formation of the polyurea layer and/or the formation of the polyurethane layer, but can instead be blown out of these layers again after the reaction and optionally reused. These amines are preferably employed by sparging with a catalyst/air mixture.

In the case of liquid curing, preference is given to using higher molecular weight amines that preferably have a flashpoint above the reaction temperature. In that case, the flashpoint is preferably above 100° C., more preferably above 150° C. They may also have a boiling point of more than 100° C., preferably more than 150° C. Since these higher molecular weight amines cannot simply be blown out of the polyurea layer and/or the polyurethane layer after the reaction, preference is given to using amines reactive with isocyanate groups. Preferred amines contain functional groups reactive with isocyanate groups, such that they are incorporated by reaction into the polyurea layer and/or polyurethane layer and hence ultimately remain in the layers. In this way, it is possible to avoid leaching-out from the coating in the course of storage or use of the fertilizer.

Suitable amines reactive with isocyanates preferably have at least one hydroxyl group, or primary or secondary amino group. These groups are capable of reacting with isocyanates. The higher molecular weight amines preferably contain one or two functional groups reactive with isocyanate groups. Particular preference is given to using amine compounds which contain at least one hydroxyl group and which especially preferably have a flashpoint of more than 100° C., especially more than 150° C.

Examples of higher-boiling amines have a flashpoint in the range from 30 to 100° C., more preferably 35 to 92° C., especially 40 to 88° C. For example, they may have a flashpoint of about 40° C. or about 88° C.

These higher molecular weight amines are preferably applied in a spray mist to the urea-containing fertilizer particles.

Preferred catalysts are described in WO 2016/166100 at page 11 line 14 to page 17 line 17. Examples of suitable catalysts are Jeffcat® Z-110 (N,N,N'-trimethylaminoethylethanolamine) Jeffcat® ZR-50 (N,N-bis(3-dimethylaminopropyl)-N-isopropanolamine), Jeffcat® ZF-10 (N,N,N'-trimethyl-N'-hydroxyethylbisaminoethyl ether) and Jeffcat® DPA (N-(3-dimethylaminopropyl)-N,N-diisopropanolamine). The amount of catalyst required depends on the desired curing time and on the working temperature. In general, about 0.1% to 20% by weight, preferably 1% to 10% by weight, especially 3% to 6% by weight, of catalyst is used, based on the total amount of water and isocyanate component used.

More preferably, the water is included in the initial charge on the dry urea-containing fertilizer particle, then the isocyanate component is applied to the moistened urea-containing fertilizer particle and then the catalyst is applied to the moistened urea-containing fertilizer particle containing the isocyanate component.

The applying of the catalyst in a spray mist, for example, is described in WO 2016/166100 at page 19 line 17 to page 20 line 4.

An alternative is sparging with a catalyst/air mixture.

The reaction temperature is preferably 30 to 150° C., more preferably 50 to 100° C.

Step B)—Forming of the Polyurethane Layer

The forming of the at least one polyurea layer on the urea-containing fertilizer is followed by the forming of the at least one polyurethane layer on the at least one polyurea layer. From the inside outward, the coated urea-containing fertilizer particles in that case have a core of fertilizer particle, a first polyurea layer and a second polyurethane layer, where one or more polyurea layers and polyurethane layers may be present in each case.

In general, the at least one polyurethane layer is formed on the at least one polyurea layer on the urea-containing fertilizer by applying a polyol component and an isocyanate component to the fertilizer particle coated with a polyurea layer and reacting the polyol component with the isocyanate component, optionally in the presence of catalysts, to give a polyurethane layer.

The polyurethane layer is preferably formed in the presence of a preferably basic catalyst. Preference is given here to using an amine compound which is more preferably reactive with isocyanates.

Particular preference is given to using an amine compound as already described above for step A). It is possible to use different or preferably identical catalysts in steps A) and B).

When a catalyst is additionally used, the amount of catalyst used, based on the total amount of polyol component and isocyanate component, is preferably 0.1% to 20% by weight, more preferably 1% to 10% by weight, especially 3% to 8% by weight.

The polyol component and isocyanate component can be applied to the urea-containing fertilizer particle successively, simultaneously or mixed together.

The catalyst may preferably be added to the polyol component or to the mixture of polyol component and isocyanate component. It may also be applied to the urea-containing fertilizer particle after application of the polyol component and the isocyanate component, for example in a spray mist or by sparging with a catalyst/air mixture.

For a description of suitable catalysts, reference may again be made to WO 2016/166100, page 11 line 14 to page 17 line 17.

The isocyanate component may be formed as described above in step A) and may be selected from aliphatic, cycloaliphatic, aromatic and heterocyclic isocyanates and mixtures thereof. The isocyanates preferably have an average of more than 1.5 isocyanate groups in one molecule. Preference is given to isocyanates having at least two isocyanate groups in one molecule or oligomers or polymers thereof.

Examples of suitable isocyanates are, for example, as described above or hereinafter: toluene 2,4-diisocyanate, toluene 2,6-diisocyanate, 3-phenyl-2-ethylene diisocyanate, naphthalene 1,5-diisocyanate, 4-methoxy-1,3-diphenyl diisocyanate, 4-chloro-1,3-phenyl diisocyanate, diphenylmethane 4,4'-diisocyanate, diphenylmethane 2,2'-diisocyanate, 4-bromo-1,3-phenyl diisocyanate, 4-ethoxy-1,3-phenyl diisocyanate, 2,4'-diisocyanatodiphenyl ether, 5,6-dimethyl-1,3-phenyl diisocyanate, 2,4-dimethyl-1,3-phenyl diisocyanate, 4,4'-diisocyanatodi-phenyl ether, 4,6-dimethyl-1,3-phenyl diisocyanate, anthracene 9,10-diisocyanate, toluene 2,4,6-triisocyanate, 2,4,4'-triisocyanatodiphenyl ether, tetramethylene 1,4-diisocyanate, hexamethylene 1,6-diisocyanate, decamethylene 1,10-diisocyanate, cyclohexylene 1,3-diisocyanate, 4,4'-bis(cyclohexyl isocyanate), xylene diisocyanate, 1-isocyanato-3-methylisocyanato-3,5,5-trimethylcyclohexane (isophorone diisocyanate), 1,3-bis(isocyanato-1-methylethyl)benzene (m-TMXDI), 1,4-bis(isocyanato-1-methylethyl)benzene (p-TMXDI).

Preference is given to aromatic isocyanates such as toluene diisocyanate, diphenylmethane diisocyanate (MDI) etc., and oligomers or polymers based thereon that are customary in the field; cf. US 2013/0305796, paragraphs [0021] to [0025]. It is also possible to use the aforementioned isocyanate-terminated prepolymers.

In the isocyanate component, the viscosity is preferably 75 to 600 mPa s, more preferably 100 to 400 mPa s, especially 150 to 300 mPa s. The content of isocyanate groups is preferably 20 to 50%, more preferably 25 to 40%, especially 30 to 35%.

The isocyanate components in steps A) and B) may be identical or different from one another.

The polyol component may have been selected from known polyol components customary for polyurethane production. For a description, reference may be made, for example, to EP-A-0 230 601, WO 03/048075, WO 2016/166100, DE-A-101 58 693, WO 2012/109432, US 2013/0305796 and U.S. Pat. No. 7,416,785. The polyol component preferably has an average of more than 1.5 hydroxyl groups, more preferably at least two hydroxyl groups.

The at least one polyol is preferably selected from cardol, cardanol, derivatives or oligomers of cardol or cardanol, condensation products of phenol and at least one aldehyde, such as formaldehyde, or mixtures thereof.

Derivatives of cardol and cardanol are reaction products in which the functional groups of cardol and cardanol have been chemically reacted with modifying compounds. The functional groups have typically been chemically reacted here with low molecular weight compounds.

Possible derivatives of cardol and cardanol may be obtained by maleating, epoxidizing or hydrogenating the double bonds present in the side chains. These can also be reacted further with water or an alcohol, forming diols or α-hydroxy ethers in the side chains. They can also be reacted further with an aldehyde after the maleating, epoxidizing or hydrogenating.

Oligomers are substances having two or more, preferably 2 to 8, units of cardol or cardanol in a chemical compound.

Cardol and cardanol are substituted phenols or resorcinols and can be obtained from renewable raw material cashew nutshell liquid (CNSL). Cashew nutshell liquid is obtained from the seeds of the cashew tree and consists to an extent of about 90% by weight of an anacardic acid and to an extent of about 10% by weight of cardol. Heat treatment in an acidic environment, through decarboxylation, gives rise to cardanol, a substituted phenol, and cardol. Cardol and cardanol can be obtained by distillation from such mixtures. It is also possible here for oligomers of these compounds to form. Cardol, cardanol and derivatives thereof can be oligomerized by known methods, for example by reaction with formaldehyde. Both the monomeric and the oligomeric compounds are of good suitability for the reaction with isocyanates owing to their hydroxyl functionalities. They can thus be used in place of or in a mixture with phenols in formaldehyde.

Condensation products of phenol and at least one aldehyde are known to the person skilled in the art. It is also possible here to use aromatic compounds derived from phenols as described in WO 2016/166100 at page 7 line 24 to page 8 line 25.

The polyol component preferably contains at least one compound selected from cardol or cardanol, derivatives thereof or oligomers thereof. The proportion thereof in the polyol component is preferably 10% to 100% by weight, more preferably 10% to 90% by weight, especially 30% to 80% by weight.

In addition, a condensation product of phenol and at least one aldehyde, such as formaldehyde, may be used in the polyol component, preferably in an amount of 10% to 90% by weight, more preferably 20% to 70% by weight, based on the polyol component.

In one embodiment, the polyol component contains 25% to 40% by weight of a condensation product of phenol and formaldehyde, 5% to 15% by weight of cardanol, 50% to 60% by weight of castor oil, 5% to 10% by weight of diethylene glycol, where the total amount adds up to 100% by weight.

The polyol component used in accordance with the invention preferably has a viscosity of 500 to 4000 mPa s, more preferably 750 to 3000 mPa s, especially 1000 to 2000 mPa s. The OH number is preferably 100 to 700 mg KOH/g, more preferably 150 to 500 mg KOH/g, especially 200 to 400 mg KOH/g.

Polyol and isocyanate components suitable for the polyol component and isocyanate component in step B) are obtainable, for example, from ASK Chemicals, Hilden, for example as ASKOCOAT™ 420 and ASKOCOAT™ 500. Amine catalysts are also obtainable from ASK Chemicals, for example as catalyst 804 and catalyst 806.

The polyol component may additionally derive from an aromatic amine-based initiator. Additionally or alternatively, it is possible to use an aromatic or aliphatic polyether polyol or polyester polyol. Suitable polyols of this kind are described in US 2013/0305796, paragraphs [0026] to [0039].

It is possible to use polyesterols, polyetherols, polyetheramines and/or polycarbonate diols having, for example, a number-average molecular weight ($M_n$) of 100 to 12 000 g/mol, a hydroxyl value of 10 to 2000 mg KOH/g and a functionality of 2 to 8; cf. EP-B-2 649 115.

The polyol component may, if desired, contain solvents or diluents and/or plasticizers. In this way, it is possible to adjust viscosity and use properties of the polyol component. For a description of the plasticizers, solvents and diluents and of the polyol component overall, reference may be made to WO 2016/166100, page 6 line 20 to page 10 line 14.

According to the invention, the polyol component and isocyanate component are preferably used in undiluted form and hence without additional use of a solvent or diluent.

By virtue of the preferred freedom from solvents, leaching of coating constituents into the soil on later use is avoided.

The polyol component and isocyanate component are used in roughly stoichiometric amounts. An excess of up to 30 mol %, preferably up to 20 mol %, especially up to 10 mol %, of one of the components over the other is possible. The molar ratio is thus preferably 1.3:1 to 1:1.3, preferably 1.2:1 to 1:1.2, especially 1.1:1 to 1:1.1.

The reaction temperature is preferably 30 to 150° C., more preferably 50 to 100° C.

The water, the isocyanate component and the polyol component can be applied in steps A) and B) in any suitable manner.

For example, the application can be effected in a rotating drum, in which the fertilizer particles to be coated are kept in motion over the entire coating operation. Water, isocyanate component from step A), polyol component and isocyanate component from step B) may be applied to the urea-containing fertilizer particles individually or in premixed form in the ratios used in steps A) and B). The catalyst may likewise be applied here in premixed form or as an individual component. The catalyst is preferably applied in the form of a spray mist, for example by spraying with compressed air or airless spraying. For a more detailed description, reference may be made to WO 2016/166100, page 19 line 9 to page 20 line 11.

Rather than a rotating drum, it is also possible, for example, to use fluidized bed systems or tubular systems or conveying screws. What is important here is the mechanical movement of the urea-containing fertilizer particles, such that the compounds applied are distributed very homogeneously over their surface.

The applying in steps A) and B) is preferably effected at a temperature in the range from 10° C. to 160° C., more preferably 20° C. to 100° C., especially 30° C. to 95° C. The temperature may be chosen here depending on the desired curing conditions for the coatings.

It is also possible in accordance with the invention to apply and cure portions of the components used in steps A) and B), such that each of steps A) and B) is performed repeatedly and the total layer thickness of the polyurea layer and/or polyurethane layer is obtained by multiple application.

The polyol component and isocyanate component are applied in step B) preferably in such an amount that the polyurethane layer is formed in an amount of at least 0.5% by weight, preferably 0.75% to 5% by weight, more preferably 0.75% to 2.5% by weight, especially 1% to 2.0% by weight, based on the untreated urea-containing fertilizer particles.

The layer thicknesses or amounts/weights of the polyurea layer and the polyurethane layer may be the same or different. Preferably, the ratio of amounts (weight ratio) of the polyurea layer to the polyurethane layer may be from 4:1 to 1:4, more preferably 3:1 to 1:3, especially preferably 2:1 to 1:2. Preferably, the layer thicknesses or amounts/weights are about the same and are in a ratio of amounts (weight ratio) of the polyurea layer to the polyurethane layer of 1:2 to 2:1, preferably 1:1.5 to 1.5:1, particularly 1:1.3 to 1.3:1, especially 1:1.1 to 1:1.3. If the coated urea-containing fertilizer particle has multiple polyurethane layers or polyurea layers, the layer thicknesses or ratios of amounts/weight ratios are based on the sum total of the respective polyurea layers and polyurethane layers. There is preferably only one polyurea layer and only one polyurethane layer.

The total amount of polyurea layer and polyurethane layer, based on the uncoated urea-containing fertilizer, is preferably 1.0% to 5.5% by weight, more preferably 1.5% to 4.0% by weight, especially 1.8% to 3.5% by weight.

In the case of provision of greater amounts of polyurea layer and/or polyurethane layer, the costs for the coating of the fertilizer will rise. In the case of provision of smaller amounts, complete encasing of the urea-containing fertilizer particles with the polyurea layer and the polyurethane layer may become difficult under some circumstances.

It is thus also possible in accordance with the invention to provide one or both layers thicker than specified. Preferably, however, the above ratios of amount and total amounts for the polyurea layer and the polyurethane layer are observed in order to achieve a long-term effect of the fertilizer particles at minimum application rates, by significantly lowering the dissolution rate of the fertilizer particles in the soil and enabling the release of the fertilizer over a prolonged period.

The polyurethane layer is preferably hydrophobic in order to make water ingress difficult after the deployment of the fertilizer. The polyurethane layer may be more hydrophobic than the polyurea layer.

Compared to a urea-containing fertilizer particle coated solely with a polyurea layer or solely with a polyurethane layer where the total layer thickness is identical to the coating of the invention, significantly more retarded release is observed in accordance with the invention. In order to achieve comparable release characteristics, significantly smaller total coating thicknesses are required. This allows the total amount of organic coating components to be applied to be distinctly reduced. Both layers or steps A) and B) or each of the two layers should preferably completely encase the fertilizer particles.

It is possible in accordance with the invention to provide further sealing layers in addition to the polyurea layer and polyurethane layer, as described, for example, in US 2013/0305796 in paragraphs [0057] to [0059]. Preference is given in accordance with the invention to dispensing with such further coatings since the polyurea layer and polyurethane layer already give the desired product properties and release properties. If required, it is possible to provide an anticaking layer on the polyurethane layer, composed, for example, of waxes or oils, as described in US 2017/0036968 in paragraph [0056].

By virtue of the adjustment of the layer thicknesses of the polyurea layer and polyurethane layer, it is possible to adjust the release characteristics for the urea-containing fertilizer in a controlled manner. Water can penetrate gradually into the granule grain through the coating layers and dissolve the nutrients of the fertilizer particle. The rate of nutrient release is controlled by the thickness of the coating, the soil moisture content and the temperature, with thinner coatings and higher temperatures leading to more rapid release. The release time may be adjusted, for example, to 0.5 to 12 months, preferably 1 to 8 months, especially 1.5 to 6 months.

The coated urea-containing fertilizer particles can be produced, for example, as described in WO 2012/109432 or WO 2016/16600.

The invention also relates to coated urea-containing fertilizer particles obtainable by the process described. The weight ratio of the at least one polyurea layer to the at least one polyurethane layer here is preferably 4:1 to 1:4, more preferably 3:1 to 1:3, especially 2:1 to 1:2.

The invention additionally relates to coated urea-containing fertilizer particles, comprising, on the urea-containing fertilizer, at least one polyurea layer and further comprising, on the at least one polyurea layer, at least one polyurethane layer.

The polyurethane layer here preferably contains the reaction product of at least one isocyanate component with at least one polyol component which contains at least one polyol selected from condensation products of phenol and at least one aldehyde, such as formaldehyde, cardol, cardanol, derivatives or oligomers of cardol or cardanol or mixtures thereof.

The fertilizer particles preferably additionally contain at least one urease inhibitor. The composition of the fertilizer particles is as described above.

The invention is elucidated in detail by the examples which follow.

EXAMPLES

Example 1

2 kg of urea granules were preheated to 70° C. for 12 hours and then transferred to a coating drum heated to 70° C. In the coating drum, the urea granules were mixed at about 30 revolutions per minute of the coating drum.

20 g of demineralized water was added to the granules.

After the granules had been wetted, 20 g of diphenylmethane diisocyanate (MDI) was added to the moistened granules within one minute. After the urea granule particles had been wetted completely, 2 ml of an amine catalyst containing hydroxyl groups and having a flashpoint of about 88° C. was applied to the wetted material with short spray pulses using compressed air as carrier gas.

Rotation of the coating drum continued until the material was free-flowing again.

Then a mixture of 13 g of polyol based on condensation products of phenol and formaldehyde, and also cardol and cardanol, was added to the coated granules together with 13 g of diphenylmethane diisocyanate (MDI) within one minute. Subsequently, 2 ml of the amine catalyst containing hydroxyl groups and having a flashpoint of about 88° C. was applied to the wetted granules with the spray gun in short spray pulses. Rotating of the coating drum was continued until the material was free-flowing again. Subsequently, the coated granules were cooled down and removed.

The isocyanate used in the first coating was Askocoat™ 500. The polyol used in the second step was Askocoat™ 420. The isocyanate used in the second step was Askocoat™ 500. The catalyst used was catalyst 806. All feedstocks are available from ASK Chemicals GmbH, Hilden.

Based on the untreated urea granules, 1% by weight of the polyurea layer (primer coating) and 1.3% by weight of the polyurethane layer were applied. According to the invention, the layer thickness is within a range from about 25 to about 50 μm.

Comparative Example 2

The procedure was as in example 1, except that only 2.3% by weight of the first polyurea layer was applied. There was no polyurethane layer.

Comparative Example 3

The procedure was as in example 1, except that there was no polyurea layer (primer coating). Instead, 2.3% by weight of the polyurethane layer was applied.

Example 4

The urea granules produced according to example 1, comparative example 1 and comparative example 2 were subjected to a release test. 5 g of the respective granules were added to 45 g of water at 25° C., agitated gently therein and then left to stand. At time intervals, the amount of urea released from the granules was determined. Then the samples were swirled. Subsequently, 300 μl of solution in each case were removed, and the urea content in the solution was determined by refractometry.

Figure 1:
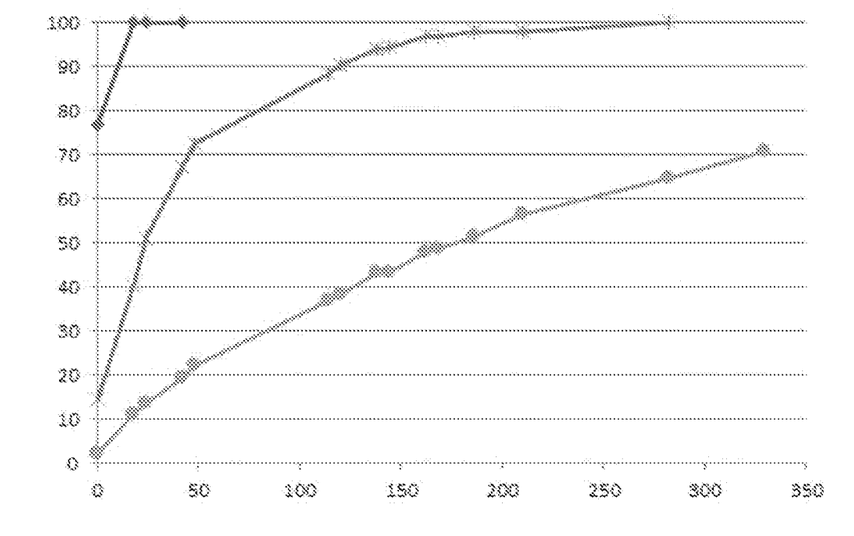
FIG. 1 shows the release characteristics as a function of time for the urea granules produced according to example 1, comparative example 1, and comparative example 2.

The release characteristics as a function of time are shown in FIG. 1, which is appended. The proportion of urea released [in percent] is plotted here against time [in hours]. The uppermost curve relates to comparative example 2, the middle curve to comparative example 3, and the lower curve to example 1.

It becomes clear from the results that the urea granules coated solely with polyurea according to comparative example 2 dissolve very quickly (upper curve). The granules coated solely with polyurethane according to comparative example 3 show much slower dissolution characteristics (middle curve).

The urea granules coated with polyurea and polyurethane according to example 1 show significantly slowed dissolution characteristics again (lower curve). As a result, desired release of the fertilizer over a prolonged period is enabled. It should be noted here that the total amount of coating applied was identical in all experiments.

The effect of the invention is achieved even with a small total amount of coating of 2.3% by weight. By comparison, the amounts of coating as described in WO 2012/109432 are 4.3% according to example 1, 5.5% according to example 3, and 4.3%, 5% and 6% according to example 4.

The invention claimed is:

1. A process for producing coated urea-containing fertilizer particles, comprising the following steps:
    A) forming at least one polyurea layer on the uncoated urea-containing fertilizer, wherein the polyurea layer is formed by reacting an organic isocyanate component containing more than one isocyanate group with water on the surface of the urea-containing fertilizer particles, and wherein no polyol is used in the reaction of the isocyanate component with water to form the polyurea layer, and wherein the isocyanate component is not a prepolymer, such that the polyurea layer does not contain any polyurethanes, and then
    B) forming at least one polyurethane layer on the at least one polyurea layer on the urea-containing fertilizer, by applying a polyol component and an isocyanate component to the fertilizer particle coated with a polyurea layer and reacting the polyol component with the isocyanate component to give a polyurethane layer, and
    wherein the weight ratio of the polyurea layer to the polyurethane layer is from 4:1 to 1:4 and, if the coated urea-containing fertilizer particle has multiple polyurethane layers or polyurea layers, the weight ratio is based on the sum total of the respective polyurea layers and polyurethane layers.

2. The process of claim 1, wherein the polyurea layer is formed and/or the polyurethane layer is formed in the presence of a basic catalyst.

3. The process of claim 2, wherein the catalyst used is at least one amine compound.

4. The process of claim 2, wherein the catalyst to form the polyurea layer is applied to the urea-containing fertilizer after the isocyanate component and/or the catalyst to form the polyurethane layer after the polyol component and after the isocyanate component.

5. The process of claim 1, wherein the urea content in the urea-containing fertilizer is at least 30% by weight, based on the urea-containing fertilizer.

6. The process of claim 5, wherein the urea content in the urea-containing fertilizer is at least 50% by weight, based on the urea-containing fertilizer.

7. The process of claim 1, wherein the polyurea layer and the polyurethane layer are each formed in an amount of at least 0.5% by weight, based on the untreated urea-containing fertilizer particles.

8. The process of claim 7, wherein the polyurea layer and the polyurethane layer are each formed in an amount of at least 0.75% by weight, based on the untreated urea-containing fertilizer particles.

9. The process of claim 1, comprising, in step A), the following steps:
    A1) applying water or steam to urea-containing fertilizer particles in order to obtain water-coated fertilizer particles,
    A2) applying an organic isocyanate component containing at least two isocyanate groups to the water-coated fertilizer particles and reacting it therewith to form a polyurea layer on the urea-containing fertilizer particles.

10. The process of claim 1, wherein the urea-containing fertilizer particles comprise at least one urease inhibitor.

11. The process of claim 1, wherein the polyurethane layer is formed using at least one polyol selected from cardol, cardanol, derivatives or oligomers of cardol or cardanol, condensation products of phenol and at least one aldehyde, or mixtures thereof.

12. The process of claim 1, wherein only one polyurea layer and only one polyurethane layer are present.

13. Coated urea-containing fertilizer particles, comprising, on the uncoated urea-containing fertilizer, at least one polyurea layer,
    wherein the polyurea layer does not contain any polyurethanes,
    and further comprising, on the at least one polyurea layer, at least one polyurethane layer, obtained by applying a polyol component and an isocyanate component to the fertilizer particle coated with a polyurea layer and reacting the polyol component with the isocyanate component to give a polyurethane layer,
    wherein the weight ratio of the polyurea layer to the polyurethane layer is from 4:1 to 1:4 and, if the coated urea-containing fertilizer particle has multiple polyurethane layers or polyurea layers, the weight ratio is based on the sum total of the respective polyurea layers and polyurethane layers.

14. The coated urea-containing fertilizer of claim 13, wherein the polyurethane layer is the reaction product of at least one isocyanate component with at least one polyol component comprising at least one polyol selected from cardol, cardanol, derivatives or oligomers of cardol or cardanol, condensation products of phenol and at least one aldehyde, or mixtures thereof.

15. The coated urea-containing fertilizer particles of claim 13, further comprising at least one urease inhibitor.

\* \* \* \* \*